June 22, 1965   A. F. ROMANOWSKI   3,190,116
FLUID FLOW-MEASURING APPARATUS
Filed Dec. 23, 1960   3 Sheets-Sheet 2
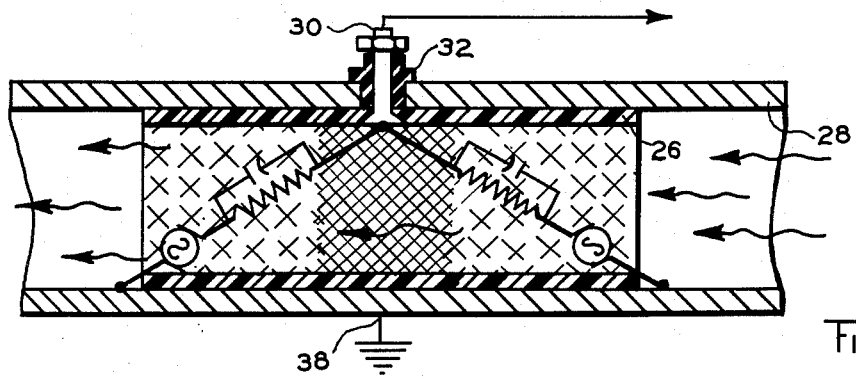
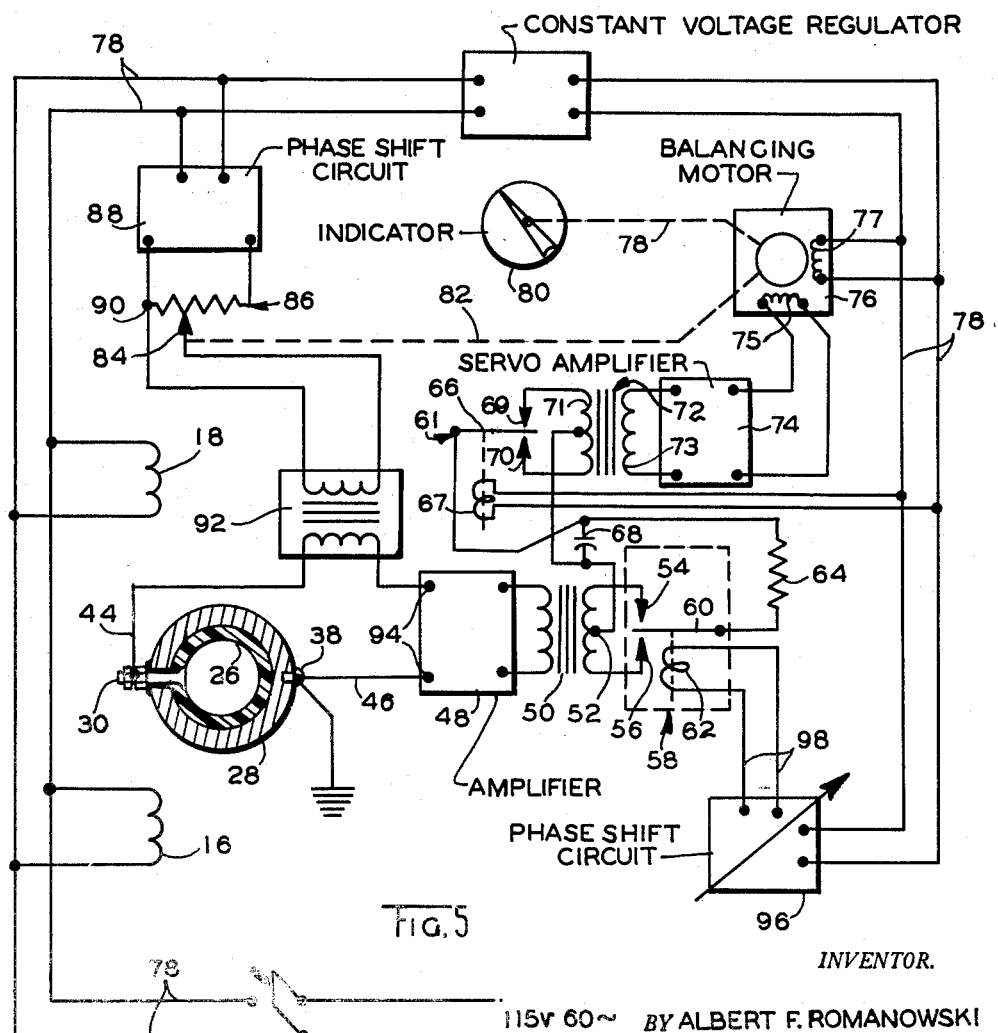
INVENTOR.
BY ALBERT F. ROMANOWSKI
Albert L. Jeffers
ATTORNEY June 22, 1965  A. F. ROMANOWSKI  3,190,116
FLUID FLOW-MEASURING APPARATUS
Filed Dec. 23, 1960  3 Sheets-Sheet 3
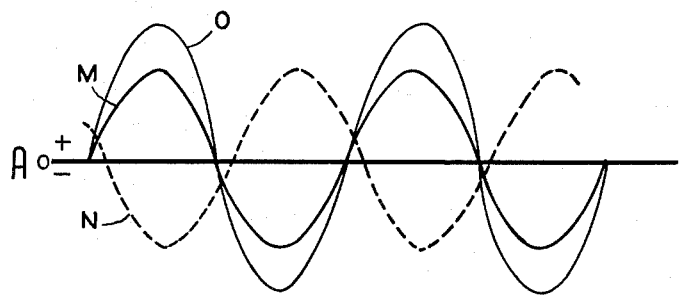
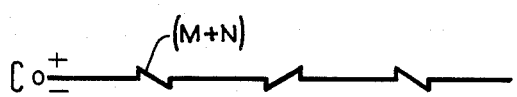
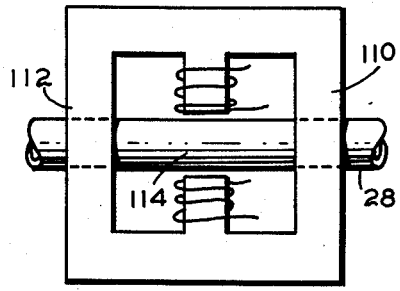
INVENTOR.
BY ALBERT F. ROMANOWSKI
Albert L. Jeffers
ATTORNEY

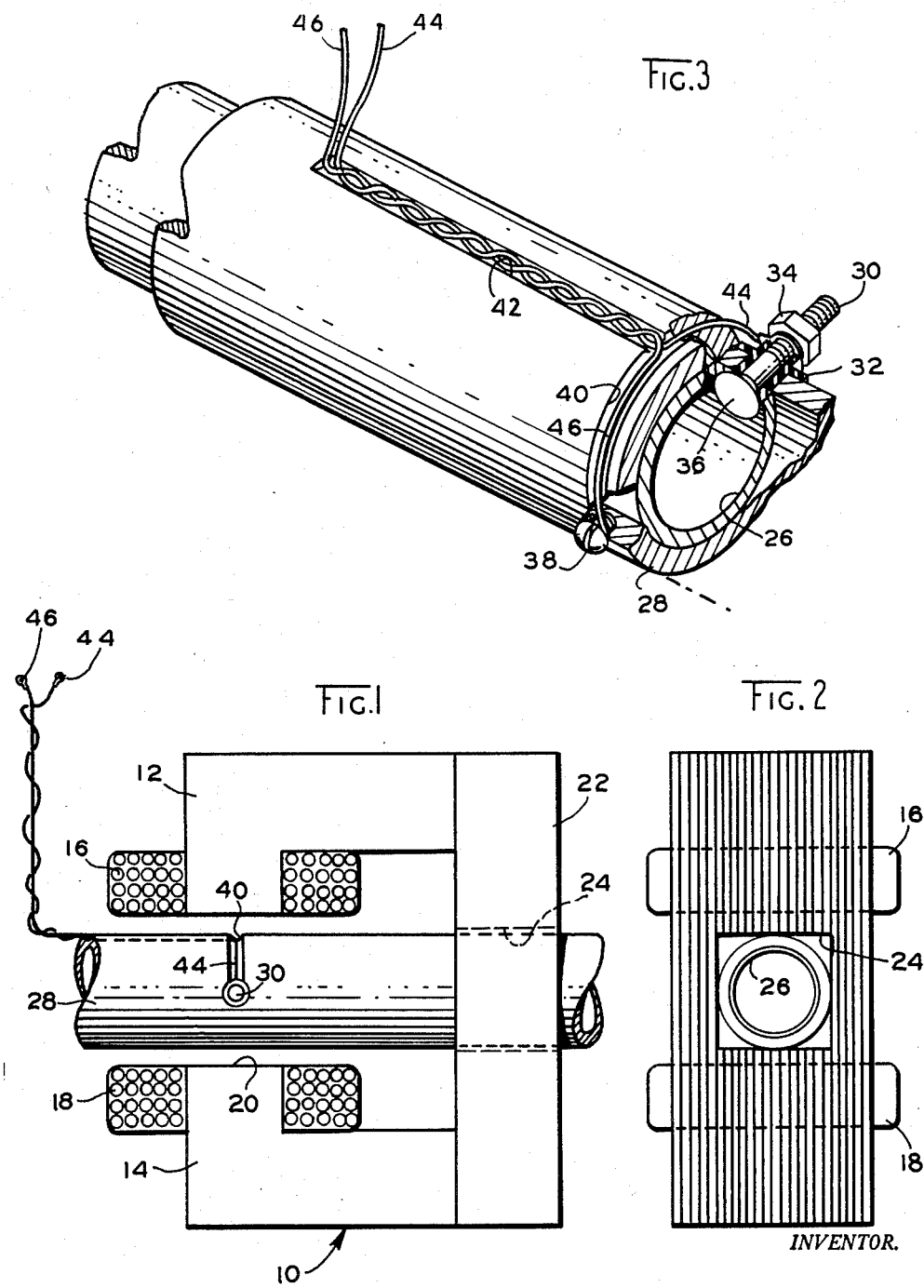

United States Patent Office 3,190,116
Patented June 22, 1965

3,190,116
FLUID FLOW-MEASURING APPARATUS
Albert F. Romanowski, Fort Wayne, Ind., assignor to Bowser, Inc., Fort Wayne, Ind., a corporation of Indiana
Filed Dec. 23, 1960, Ser. No. 77,989
13 Claims. (Cl. 73—194)

The present invention relates to fluid flow-measuring apparatus, and more particularly to electromagnetic apparatus useful in measuring the volume of fluid or liquid passing a given point in a conduit in a given period of time.

In my prior Patent #2,770,130, I disclose and claim a magnetic flowmeter which operates on somewhat the same basic principles as the present invention. The present invention, however, constitutes a decided improvement thereover in many different respects as will become apparent from the following description, but of particular interest in considering the present invention is the fact that the instrument may be calibrated in the factory and then installed in the field without requiring recalibration. Other advantages and improvements are explained in connection with the description of the invention.

It is an object of this invention to provide a fluid flow-measuring apparatus which may be calibrated in the factory and then installed in a field system without requiring recalibration.

It is another object of this invention to provide fluid flow-measuring apparatus which eliminates or otherwise substantially minimizes circulating electrical currents in the pipe system which have been found in the past to interfere with the proper operation of the apparatus.

It is still another object of this invention to provide such an apparatus which does not require frequent recalibration during use in order to obtain measurements of relatively high accuracy.

It is yet another object of this invention to provide in such an apparatus a reference ground potential against which all measurements may be made, this reference ground potential being common to the liquid being measured as well as to the piping system which carries the liquid. By so providing such a common ground reference potential, errors due to differences in ground connections in the apparatus have been eliminated.

Other objects will become apparent as the description proceeds.

In achieving the objects of this invention there is provided an apparatus comprising a first fluid-conducting member of nonmagnetic nonconductive material, a second fluid-conducting member of nonmagnetic electrically conductive material disclosed exteriorally of the first member, means for providing two oppositely polarized magnetic fields which extend across two spaced-apart cross-sectional areas of said second member, and two output terminals communicating with the interior of said first and second members, one of these terminals being insulated from the second member and disposed within one of the aforementioned magnetic fields. As will appear from the following description, the means for providing the two oppositely polarized magnetic fields may take different forms without departing from the spirit and scope of this invention.

Other objects and features of the invention will become apparent from the following description which proceeds with reference to the accompanying drawings, wherein:

FIG. 1 is a side elevation of the magnetic device used in the present invention for the purpose of inducing measurable voltages in the liquid carried by the conduit;

FIG. 2 is a rear end view of the arrangement of FIG. 1;

FIG. 3 is a fragmentary perspective illustration, shown partly in section, of the coaxial tube and electrode structure used in the present invention;

FIG. 4 is an axial sectional illustration of the coaxial tube structure of FIG. 3, and equivalent circuit;

FIG. 5 is a schematic diagram of the electrical circuit used in conjunction with the apparatus already illustrated in FIGS. 1 through 4 inclusive;

FIG. 6 is a series of waveforms used in explaining the principles of operation of the present invention;

FIG. 7 is a diagrammatic illustration of the magnetic circuit used in explaining the principles of operation of this invention;

FIG. 8 is an equivalent circuit diagram used in explaining the principles of operation of this invention; and FIG. 9 is a side elevation, in outline form, of an alternative magnet construction which may be used in this invention.

Referring to the drawings, and more particularly to FIGS. 1 and 2, a C-shaped magnet indicated generally by the reference numeral 10, is made up of a series of conventional laminations secured together in the customary manner. On the pole portions 12 and 14 of this magnet are provided two coils 16 and 18 respectively, these coils being electrically connected together in a manner as will produce a reinforced magnetic field between the faces of the two poles 12 and 14. The poles 12 and 14 are separated to provide a first air gap 20.

The straight rear portion of the magnet 10, indicated by the numeral 22, is provided with a symmetrically disposed square opening 24. This opening 24 may be considered as providing a second air gap. This air gap 24 is located midway between the opposite ends of the straight side 22 and is in substantial alignment with the air gap 20 already described. The magnet 10 is symmetrical with respect to a horizontal line connecting the centers of both air gaps 20 and 24.

A pair of coaxial tubes are symmetrically positioned inside both air gaps 20 and 24, these tubes being more clearly illustrated in FIG. 3. The inner tube 26 is formed of nonmagnetic electrically nonconductive material such as plastic or ceramic and is intimately surrounded by a second tube 28 which is formed of nonmagnetic but electrically conductive material. This latter material may be copper or nonmagnetic stainless steel, for example. The outer tube 28 extends beyond the ends of the inner tube 26, as is more clearly shown in FIG. 4, and constitutes that portion of the instrument which is connected in series with an existing fluid-conducting pipeline, not shown.

A terminal or electrode 30, which may be in the form of an ordinary unslotted copper or nonmagnetic stainless screw, passes through the walls of both tubes 26 and 28 with the head 36 thereof disposed inside the tube 26. This terminal 30 is insulated from the outer tube 28 by means of a sleeve 32 of rubber, plastic or the like, a nut 34 on the terminal securing the latter in place. The head 36 is fully exposed to be contacted by liquid or fluid conducted by the tubes 26, 28. The terminal 30 is located precisely midway between the opposite ends of the tube 26.

Another terminal 38 in the form of an ordinary screw threaded into the outer pipe 28 is located diametrically opposite from the first terminal 30. This terminal 38 is electrically connected to the outer tube 28.

A circumferential groove 40 in the outer tube 28 extends between the two terminals 30 and 38. Another groove 42 extends axially within the outer tube 28 and communicates with the arcuate groove 40. This groove 42 is of a length which extends outside of the magnetic circuit as illustrated in FIG. 1, as will become more apparent from the following description.

Two wires or leads 44 and 46 are connected respectively to the terminals 30 and 38, and are passed through the groove 40 to the entrance to the groove 42. At this point, the leads are twisted together and laid in the groove 42 as shown more clearly in FIG. 3. These leads 44 and 46 are secured in conductor 28 by filling the grooves 40 and 42 with a suitable plastic material. Thus, the leads are connected only to the terminals 38 and 30 respectively.

Referring once again to FIG. 1, the precise position of the terminal 30 with respect to the magnetic circuit will now be described. This terminal 30 is positioned midway between the faces of the two poles 12 and 14 and at right angles to a line drawn therebetween. In other words, the length or axis of the terminal 30 is at right angles to the field or flux lines which flow between the faces of the two poles 12 and 14. It may be stated at this point that these faces preferably are flat and parallel with the axis of the terminal 30 also being parallel thereto. Further, the cross-sectional area of the tubes 26 and 28, which includes the axis of terminal 30, is precisely centered in the magnetic field such that the flux lines divided substantially equal on opposite sides of the area. The reason for this precise positioning of the terminal 30 will become apparent from the following description.

Referring now to FIG. 5, the electrical circuit used in conjunction with the magnetic system will now be described. Like numerals indicate like parts.

An ordinary electronic amplifier 48 has an output circuit to which is connected an ordinary transformer 50. The secondary winding of this transformer 50 is center tapped at 52, the opposite ends of this winding being connected to two stator contacts 54 and 56, respectively, of an electric mechanical chopper indicated generally by the numeral 58. This chopper is provided with an armature 60 movable between the two stator contacts 54 and 56, respectively, for alternate contact therewith. An energizing coil 62 is operatively coupled to the armature 60 for moving the latter between the two contacts 54 and 56.

The circuitry for energizing this coil 62 will be described hereinafter.

Leading from the armature 60 is an integrating circuit composed of a resistor 64 which is connected at its other end to an armature 66 of another chopper 61. The capacitor 68 of this integrating circuit is connected between the armature 66 and center tap 52 of the transformer 50. The armature 66 is alternately movable between the two stator contacts 69 and 70, respectively, these contacts in turn being connected to the opposite ends of the primary winding of another transformer 72. The center tap of this transformer 72 is connected to the center tap 52 of the first transformer 50. The two choppers 58 and 61 may be identical. The armature 66 is alternated by a coil 67 connected across the line 78.

The secondary winding of the transformer 72 is connected to the input circuit of a servo amplifier 74 of conventional design, the output circuit of this amplifier 74 being connected to one phase winding of a servo motor 76. The other phase winding of the servo motor 76 is connected to a supply line 78 which is also connected to the two coils 16 and 18 (FIG. 1) of the magnet 10 circuit system.

The servo motor 76 is provided with the usual shaft 78 which carries an indicating needle 80. This needle 80 may be used in conjunction with a printed scale for reading measurements as the needle swings. Connected for rotation to the shaft 78 in some suitable manner is another shaft 82 which extends to the movable arm 84 of a variable potentiometer 86. The opposite ends of this potentiometer 86 are connected to the output circuit of a phase shifter 88, the input circuit of this phase shifter being connected across the line 78. The configuration of this phase shifting circuit 88 is conventional and serves the purpose of reversing the phase of the alternating voltage on the line 78 by one hundred and eighty degrees (180°) such that this 180° out of phase voltage is impressed across the ends of the variable potentiometer 86.

Connected between one end 90 of this potentiometer and the variable tap 84 is the primary winding of another transformer 92. The secondary winding of this transformer 92 is connected in series with the line 44 from the terminal 30 and the input circuit terminals 94 of the amplifier 48. It will now be obvious that the circuitry just described constitutes a servo-loop which is completed by the mechanical portion 82 which may be in the form of a shaft connected to the rotary arm 84 on the variable potentiometer 86. This connection is such that as the shaft 82 rotates in response to rotation of the servo motor shaft 78, the rotary arm 84 will rotate to a different position on the potentiometer 86.

Another phase shift circuit indicated by the numeral 96 has its input circuit connected to the power line 78 and its output circuit connected to the chopper coil 62. This phase shifter 96 is conventional in construction and is continuously adjustable such as to vary the phase of the voltage which it produces across its output circuit 98 with respect to the voltage on the line 78. The purpose of this variable phase adjustment will become apparent from the following description.

The instrument thus far described is used in measuring the quantity of fluid or liquid flowing through a pipe in a given period of time. In other words, the instrument is capable of providing a measurement of flow in gallons per minute or any other units of measure as may be desired.

Considering the operation of the invention thus far described, it is connected into an existing pipeline by means of suitable couplings such that all the liquid flows through the two pipes 26 and 28 as indicated by the arrows in FIG. 4. By this means, the pipe 28 becomes a part of the total piping system such that any electrical currents conducted by the piping system will also flow through the pipe 28.

In theory, the liquid to be measured must have some degree of electrical conductivity. This liquid when passed through a magnetic field has a voltage induced therein which is conducted away and applied to a measuring instrument. Considering FIGS. 1 and 5 for the moment, the voltage induced by the magnet 10 in the liquid passing through the pipes 26 and 28 is governed by the formula:

$$E = \frac{d\Phi}{dt} lv \, 10^{-8} + A$$

where A is the voltage induced in the liquid when it is not flowing. The term $$\frac{d\Phi}{dt}$$

is the usual function of flux change, $l$ is the width of the flowing stream intercepted by the magnetic flux, and $v$ is the velocity of liquid flow. Thus it is realized that the higher the velocity of liquid flow, the greater will be the voltage induced to the liquid. This is the principle of operation upon which the present invention is based.

When an A.C. voltage of the line 78 is applied to the two coils 16 and 18, a magnetic field is set up in the air 20 which alternates between the two poles 12 and 14. The flux lines pass through the iron of the magnet 10, and some of this flux passes through the air gap 24 (FIG. 2). Since the pipes 26 and 28 are positioned inside the air gaps 20 and 24, it is obvious that the flux lines will cut axially spaced apart cross-sectional areas of these pipes. These areas are planar and parallel in the illustrated embodiment. In doing so, voltages will be induced in both the liquid and pipe 28, since both are conductive.

The terminal 30 is positioned in the center of air gap 20, or in other words is positioned in the center of the magnetic field existing between the two poles 12 and 14. Also, this terminal 30 is at right angles to this field. Any voltage induced in the liquid may thereby be tapped off by means of the terminal 30 and the ground connection 38, this voltage being utilized as will be hereinafter explained for the purpose of determining the rate of liquid flow.

Considering FIG. 7 for the moment, it will be noted that at any given instant of time flux lines will be passing through the magnet 10 and through the air gaps in the directions of the arrows 100 and 102, respectively. The flux lines 102 produce a circulatory current in the pipe 28 as well as in the liquid in the direction of the arrow 104. In this respect, it must be remembered that the pipe 28 comprises only part of a complete piping system which, in effect, forms a closed circuit for currents induced in the section 28. This is more fully explained hereinafter in connection with FIG. 8. Unless this current 104 were balanced out or compensated for in some manner, it is readily seen that it would cause the generation of voltages in the liquid which would not be a true indication of liquid flow. These voltages are termed "noise" and should be eliminated or substantially minimized inasmuch as they can be greater than the desired signal. The balance of this circulating current 104 is accomplished automatically by reason of the flux lines 100 cutting the pipe 28 in an opposite direction, thereby producing a current 106 which flows in the direction opposite to that of 104. By proper design of the magnetic system, these two currents 104 and 106 may be made equal or substantially equal whereby circulating currents induced by the magnet 10 in the region of the magnet can be reduced to zero or otherwise rendered or negligible consequence. This is an important aspect of the present invention, since it reduces the noise level of the signal being measured.

FIG. 8 illustrates the same principle and is an equivalent electrical diagram of the system of FIG. 7. The pipe 28 is nothing more than the secondary of a transformer, the portion of the pipe 28 passing through the flux lines 100 generating a current 106 which is opposite to the direction of the current 104 generated in that portion of the pipe 28 which is traversed by the flux lines 102. The lead 105 represents the remainder of the piping system providing a closed circuit loop for currents induced in pipe 28. The two currents 104 and 106 being opposite in the secondary of the transformer results in no current flowing in the secondary. The capacitor 108 represents the terminal 30 which is insulated from the pipe 28 by means of the sleeve 32 and suggests that the output signal fed to the load will contain a capacitive component which is phase displaced from the resistive component which is to be desired. This phase displacement is automatically compensated for in the system of FIG. 5 as will be explained more fully in the following.

Having now explained that voltages induced in the liquid appear across the terminals 30 and 38 and can be measured, the circuitry by which these measurements are made will now be explained.

Referring to FIG. 5, it should be recognized at this point that the signal appearing across the terminals 30 and 38 is not necessarily in phase with the voltage on line 78. The reason for the phase displacement is attributable to many different causes, among which are capacitive and inductive coupling as well as the extremely high resistance of the liquid which in some instances may introduce capacitive effects. Stray currents in the pipeline may produce out of phase voltages as well as other conditions which need not be mentioned here. In any event, some means must be provided for compensating for the phase displacement between the terminals 30 and 38 especially in the calibration of the instrument to find the zero or "no-flow" condition.

With liquid present in the pipe 28 which is not flowing therethrough, a certain signal will appear across the terminals 30, 38. This signal is represented by the sinewave $m$ in FIG. 6A. This wave $m$ is fed through the amplifier 48 and applied to the secondary winding of the transformer 50. The chopper 58 is energized such as to cause the armature 60 to have equal dwell time on the stator contacts 54 and 56. As a result, the armature 60 will contact stator 54 during a portion of one-half cycle of the input sinewave and the contact 56 during an equal portion of the other half cycle of the sinewave. The chopper therefore acts as a full wave rectifier applying pulses of voltage to the integrating circuit 64, 68. This results in the development of a unidirectional potential which is applied to the armature 66 and center tap of the primary winding 71 of the transformer 72 from across the condenser 68, the operation of this armature 66 in synchronism with the voltage on line 78, serving to apply this signal to the opposite ends of the winding. An A.C. voltage in phase with line 78, voltage is thereby developed in the secondary 73 of this transformer which is coupled to the input circuit of the servo amplifier 74. Thus, the chopper 58 converts alternating current into direct current while the second chopper 61 converts the direct current into alternating current.

The servo amplifier 74 is of conventional design and produces an alternating voltage output which corresponds in phase to the amplitude of the input signal. This alternating voltage is applied to one coil or winding 75 of the servo motor 76. The other winding 77 of the servo motor is coupled to the line 78 such that the two windings will ordinarily have phase displaced voltages thereon. The servo motor 76 is conventional in that its rotor will turn a distance depending upon the phase displacement of the voltages applied to the two windings thereof. The sinewave $m$, therefore, applied to the input circuit of the amplifier 48 will thereupon cause some rotation of the servo motor shaft 78 depending upon the phase displacement of the two voltages which are applied to the windings 75 and 77. This results in the rotation also of the shaft 82 which turns the rotor 84 of the variable potentiometer 86. A change in amplitude of the signal applied to the primary winding of the transformer 92 results, this change in amplitude being in a direction equal the amplitude of the signal generated across two terminals 30 and 38. The voltage appearing across the secondary winding of the transformer 92 is represented by the letter $n$ in FIG. 6A.

It will be noted that the two voltages from the transformer 92 and the terminals 30, 38 are connected in series such that by having the voltages exactly 180° out of phase, the input to the amplifier 48 may be nulled out completely, thereby resulting in zero voltage input to the servo amplifier 74. However, as already explained, the voltage appearing across the terminals 30 and 38 is somewhat out of phase with the line voltage 78 which determines the phase of the voltage appearing across the secondary windings of the transformer 92. This being the case, the two voltages $m$ and $n$ will be slightly out of phase from the ideal 180° displacement, this displacement being illustrated in FIG. 6A. There thus results a wave in FIG. 6B indicated by the reference $(m+n)$ which alternates as shown. It is obvious that unless this wave $(m+n)$ is eliminated or compensated for, the system cannot operate properly.

In calibrating the system, as already explained, the liquid in the pipe 28 is at rest. After the servo loop has initially adjusted itself, which requires only an instant of time, the phase shifter 96 is adjusted until the servo motor 76 remains stationary as does the indicator 80. In this condition, the system is calibrated at zero flow.

In theory, this zero calibration is accomplished in the following manner. The phase shifter 96 is adjusted such that the armature 60 contacts the two stator contacts 54 and 56 at just before and just after the precise time the wave $(m+n)$ crosses the zero axis. In FIG. 6C is illustrated the signal which is derived from this wave $(m+n)$, it being noted that the positive and negative portions of the segment wave in FIG. 6C are equal. Since this wave is applied to the condenser 68, this condenser will be charged and discharged by the same amount, thereby leaving a zero charge thereon. Thus, no voltage whatsoever is applied to the servo amplifier 74 whereby there is no output signal to be applied to the servo motor 76. Thus, adjustment of the phase shifter 96 results in compensating or discriminating against the wave $(m+n)$ which represents the phase displacement between the signal appearing across the terminals 30 and 38 and the secondary of the transformer 92.

The apparatus is now calibrated and may be considered in connection with making a measurement of liquid flow. For this purpose, it is now assumed that the liquid is moving in the pipe 28 at a given rate. This being the case, a new signal will be generated across the terminals 30, 38, this signal being of greater amplitude than the former one $m$. This new signal is indicated by the letter $o$ in FIG. 6A. Since this wave $o$ is compared with the wave on the secondary of the transformer 92, a resultant wave for the input circuit 94 of the amplifier 48 is produced, this resultant wave being indicated by the quantity $(o+n)$ in FIG. 6B. It will now be noted that the wave $(o+n)$ crosses the axis at a different point than the wave $(m+n)$ such that the chopper 58 now produces a series of positive pulses as illustrated in FIG. 6B. These pulses are integrated in the circuit 64, 68 into a unidirectional potential which is thereafter applied to the armature 66. This voltage is then applied to the servo amplifier 74 in alternating form, this amplifier in turn producing an alternating voltage output. The phase of this output voltage is dependent upon the amplitude of the voltage applied to the input circuit of the servo amplifier 74, which phase will be displaced from that of the line 78. The servo motor 76 will thereby operate. The shafts 78 and 84 will rotate until the amplitude of the wave $n$ (FIG. 6A) equals the amplitude of the wave $o$, in which case the crossover point of the wave $(o+n)$ will coincide with that of $(m+n)$. When this happens, the voltage appearing across the condenser 68 drops to zero, thereupon causing the servo motor 76 to stop. The indicator 80 may then be observed to obtain the rate of flow of the liquid in the pipe 28.

From the foregoing, it will be apparent that for every change in flow in the pipe 28, the servo loop will pass through a balancing cycle moving the indicator 80 to a new value.

Through the use of the phase shifter 96 and the two choppers, phase differences in the signals carried across the terminals 30 and 38 may be discriminated against and prevented from interfering with the making of measurements. Other and additional advantages will appear as obvious to a person skilled in the art.

From the foregoing, it will be understood that other components and circuit configurations may be used without departing from the scope of this invention. As an example of an alternative component, reference is made to FIG. 9 wherein a different type of magnet is shown. This magnet is identical to that of FIGS. 1 and 2 with the exception that it is duplicated so as to comprise two C-shaped magnets attached to each other end-to-end. This magnet has two straight sides 110 and 112 through which the pipe 28 passes and a centrally disposed air gap 114 positioned midway between the two legs 110 and 112. Analysis of the voltages and currents induced in the pipe 28 will reveal that the voltages induced in the pipe by the two legs 110 and 112 will be in opposition to the voltage induced by the air gap 114.

While I have described above the principles of my invention in connection with specific apparatus, it is to be clearly understood that this description is made only by way of example and not as a limitation to the scope of my invention.

I claim:

1. Apparatus for measuring fluid flow comprising a first fluid-conducting member of non-magnetic non-conductive material, a second fluid-conducting member of non-magnetic electrically conductive material disposed exteriorly of said first member, said second fluid-conducting member being in electrical contact with fluid flowing therethrough, means for providing magnetic fields which extend entirely across a plurality of spaced-apart cross-sectional areas of said second member, said magnetic fields being such as to produce eddy currents in said second fluid-conducting member which oppose and nullify each other to thereby prevent eddy current flow therein, and two output terminals, one of said output terminals being electrically connected to said second member and the other of the output terminals being insulated from the second member, said other output terminal extending through both said first and second members so as to be in electrical contact with fluid flowing through the members and centrally disposed within one of said magnetic fields such that flux lines are divided substantially equally on opposite sides of the terminal.

2. Apparatus for measuring fluid flow comprising a first fluid-conducting member of non-magnetic non-conductive material, a second fluid-conducting member of non-magnetic electrically conductive material disposed exteriorly of said first member and in electrical contact with fluid flowing therethrough, a magnetic circuit having spaced-apart portions which lie in the same general plane, said portions each having an air gap therein, said first and second members extending through said air gaps whereby two oppositely-polarized magnetic fields extend entirely across spaced-apart cross-sectional areas of said first and second members when said magnetic circuit is energized to thereby prevent the flow of eddy currents in said second fluid-conducting member, and two output terminals, one of said output terminals being electrically connected to said second fluid-conducting member and the other terminal being insulated from the second fluid-conducting member, the second output terminal extending through the first and second fluid-conducting members so as to be in electrical contact with fluid flowing through the fluid conducting members and disposed centrally within in one of said magnetic fields at a substantially right angle to said magnetic field.

3. Apparatus for measuring fluid flow comprising a first fluid-conducting member of non-magnetic non-conductive material, a second fluid-conducting member of non-magnetic electrically conductive material disposed exteriorly of said first member and in electrical contact with fluid flowing therethrough, a magnetic circuit having a C-shaped section providing a single closed loop for magnetic flux induced therein, said first and second members extending through said C-shaped section with said section lying in the same general plane as said members, induction coil means surrounding said C-shaped section to induce flux therein, and two output terminals, one of said output terminals being electrically connected to said second fluid-conducting member and the other output terminal being electrically insulated from said second fluid-conducting member, the other output terminal extending through said first and second fluid-conducting members so as to be in electrical contact with fluid flowing through the members and centrally disposed within one region of intersection between said C-shaped section and said first and second members at such a substantially right angle to the magnetic field created by the magnetic circuit such that the flux lines are divided substantially equally on opposite sides of the terminal.

4. Apparatus for measuring fluid flow comprising a first tube of insulation, a second tube of nonmagnetic electrically conductive material telescoped over said first tube and in electrical contact with fluid flowing therethrough, a magnet having a C-shaped cross-section, said magnet having spaced apart poles providing a first air gap, said magnet further having an opening in the midportion of the back side providing a second air gap, said second tube extending through both air gaps, said first tube extending through at least one of said air gaps, one output terminal extending through both tubes but being insulated from said second tube, said terminal being disposed adjacent to and at an angle to said one air gap, another terminal connected to said second tube and induction coil means surrounding the cross section of said magnet for inducing flux therein.

5. Apparatus for measuring fluid flow comprising a first tube of insulation, a second tube of nonmagnetic electrically conductive material telescoped over said first tube and in electrical contact with fluid flowing therethrough, a magnet having a C-shaped cross-section, induction coil means surrounding the cross section of said magnet to induce flux therein, said magnet having spaced apart poles providing a first air gap, said magnet further having an opening in the midportion of the back side providing a second air gap, said second tube extending through both air gaps, said first tube extending through at least one of said air gaps, one output terminal extending through both tubes but being insulated from said second tube, said terminal being disposed adjacent to and at an angle to said one air gap, a second output terminal connected to said second tube at a location diametrically opposite said one terminal, a first groove in said second member extending circumferentially from one terminal to the other terminal, a second groove of predetermined length in said second member extending axially thereof from the midpoint of said first groove, and a pair of conductors connected to said terminals respectively and extending through said first and second grooves, said conductors being twisted together in the second groove to balance out any voltages directly induced therein by said magnet.

6. Apparatus for measuring fluid flow comprising a first tube of insulation, a second tube of nonmagnetic electrically conductive material telescoped over said first tube and in electrical contact with fluid flowing therethrough, a magnet having a C-shaped cross-section, induction coil means surrounding the cross section of said magnet to induce flux therein, said magnet having spaced apart poles providing a first air gap, said magnet further having an opening in the midportion of the back side providing a second air gap, said second tube extending through both air gaps, said first tube extending through at least one of said air gaps, one output terminal extending through both tubes but being insulated from said second tube, said terminal being disposed adjacent to and at an angle to said one air gap, a second output terminal connected to said second tube at a location diametrically opposite said one terminal, a first groove in said second member extending circumferentially from one terminal to the other terminal, a second groove of predetermined length in said second member extending axially thereof from the midpoint of said first groove, a pair of conductors connected to said terminals respectively and extending through said first and second grooves, said conductors being twisted together in the second groove to balance out any voltages directly induced therein by said magnet, and means for measuring a voltage appearing across said terminals.

7. Apparatus for measuring fluid flow comprising a first fluid-conducting member of nonmagnetic nonconductive material, a second fluid-conducting member of nonmagnetic electrically conductive material disposed exteriorly of said first member and in electrical contact with fluid flowing therethrough, means for providing two oppositely polarized magnetic fields which extend entirely across two spaced apart cross-sectional areas of said second member to generate eddy currents in the second member which oppose and nullify each other, two output terminals, one of said terminals being electrically connected to said second fluid-conducting member and the other of the terminals being insulated from said second member and extending through the first and second members so as to be in electrical contact with fluid flowing through the members, said other terminal being disposed within one of said magnetic fields, a source of variable voltage, means connecting said source to said magnetic means for varying said fields in accordance with said voltage, a servo loop circuit connected to said two output terminals, a voltage indicating device in said circuit, and means rendering said indicating device responsive to changes in amplitude in the voltage appearing across said two output terminals.

8. Apparatus for measuring fluid flow comprising a first fluid-conducting member of nonmagnetic nonconductive material, a second fluid-conducting member of nonmagnetic electrically conductive material disposed exteriorly of said first member and in electrical contact with fluid flowing therethrough, means for providing two oppositely polarized magnetic fields which extend entirely across two spaced apart cross-sectional areas of said second member to generate eddy currents in the second member which oppose and nullify each other, two output terminals, one of said terminals being electrically connected to said second fluid-conducting member and the other of the terminals being insulated from said second member and extending through the first and second members so as to be in electrical contact with fluid flowing through the members, said other terminal being disposed within one of said magnetic fields, a source of variable voltage, means connecting said source to said magnetic means for varying said fields in accordance with said voltage, a servo loop circuit connected to said two output terminals, a voltage indicating device in said circuit, a voltage-balancing circuit in said loop connected to said output terminals, said voltage-balancing circuit including means operable to generate a voltage which is equal in magnitude to but displaced in phase 180° from the voltage appearing across said two output terminals, and means operatively connecting said voltage-indicating device to said voltage-balancing circuit means for operating the latter to a point at which balancing of the terminal voltage occurs.

9. Apparatus for measuring fluid flow comprising a first fluid-conducting member of nonmagnetic nonconductive material, a second fluid-conducting member of nonmagnetic electrically conductive material disposed exteriorly of said first member and in electrical contact with fluid flowing therethrough, means for providing two oppositely polarized magnetic fields which extend across two spaced apart cross-sectional areas of said second member, two output terminals, one of said terminals being electrically connected to said second fluid-conducting member and the other of the terminals being insulated from said second member and extending through the first and second members so as to be in electrical contact with fluid flowing through the members, said other terminal being disposed within one of said magnetic fields, a source of variable voltage, means connecting said source to said magnetic means for varying said field in accordance with said voltage, a servo loop circuit connected to said two output terminals, said servo loop having input and output circuits, a phase discriminator coupled to said input circuit, said phase discriminator including means which is insensitive to phase discrepancies in a signal applied to said input circuit, the last-mentioned means producing a second signal which corresponds to the amplitude of a voltage appearing across said output terminals, a voltage indicator coupled to said last-mentioned means and responsive to said second signal, a voltage balancing circuit coupled to said input circuit and operative to provide a voltage which is 180° out of phase with a voltage appearing across said output terminals, means connecting said output terminals in series with said voltage-balancing circuit and said input circuit, and means operatively coupling said voltage indiactor to said voltage-balancing circuit for adjusting the amplitude of the voltage from the voltage-balancing circuit until it equals the amplitude of the voltage across said output terminals.

10. For use in apparatus for measuring flow of fluid, a servo system comprising a first source of variable signals to be measured, phase-discriminating means coupled to said source for converting said variable signals into a unidirectional potential and for producing no potential from a predetermined signal out of phase with said variable signal, means for converting said unidirectional potential into an alternating signal which changes in phase in response to changes in amplitude of said unidirectional potential, a second source of alternating reference voltage, means responsive to the difference in phase between said alternating signal and said reference voltage for measuring the amplitude of said unidirectional potential, a third source of alternating voltage connected in series with said first source, the frequencies of said first and third source voltages being equal but displaced 180° out of phase, and means for changing the amplitude of the third source voltage until it equals the amplitude of the first source voltage in response to operation of said measuring means.

11. For use in apparatus for measuring flow of fluid, a servo system comprising a first source of variable signals to be measured, a chopper having two stator contacts which are alternately contacted by an armature, said stator contacts being coupled to said source, means for adjusting the phase of movement of said armature between said contacts, an integrating circuit coupled to said chopper for providing a unidirectional potential, means for converting said unidirectional potential into an alternating signal which changes in phase in response to changes in amplitude of said unidirectional potential, a second source of alternating reference voltage, means responsive to the difference in phase between said alternating signal and said reference voltage for measuring the amplitude of said unidirectional potential, a third source of alternating voltage connected in series with said first source, the frequencies of said first and third source voltages being equal but displaced 180° out of phase, and means for changing the amplitude of the third source voltage until it equals the amplitude of the first source voltage in response to operation of said measuring means.

12. For use in apparatus for measuring flow of fluid, a servo system comprising a first source of variable signals to be measured, a chopper having two stator contacts which are alternately contacted by an armature, said stator contacts being coupled to said source, means for adjusting the phase of movement of said armature between said contacts, an integrating circuit coupled to said chopper for providing a unidirectional potential, a second chopper having an armature alternately movable between two stator contacts, a second source of alternating reference voltage, means operating the second armature from said second source, said integrating circuit being connected to said second chopper to reconvert said unidirectional potential into an alternating signal of the same frequency as said second source, a servo amplifier coupled to said second chopper and operative to change the phase of said alternating signal to different degrees corresponding to the instantaneous values of said unidirectional potential, means responsive to the difference in phase between said alternating signal and said reference voltage for measuring the amplitude of said unidirectional potential, a third source of alternating voltage connected in series with said first source, the frequencies of said first and third source voltages being equal but displaced 180° out of phase, and means for changing the amplitude of the third source voltage until it equals the amplitude of the first source voltage in response to operation of said measuring means.

13. The system of claim 12 wherein said measuring means includes a servo motor having a shaft, said third source includes a transformer having a variable potentiometer connected to the primary thereof, and means connecting said shaft to said variable potentiometer for varying the voltage applied to said transformer in response to rotation of said shaft.

References Cited by the Examiner

UNITED STATES PATENTS

| | | | |
|---|---|---|---|
| 2,583,724 | 1/52 | Broding | 73—194 |
| 2,607,223 | 8/52 | Fleming | 73—194 |
| 2,637,207 | 5/53 | De Boisblanc | 73—194 |
| 2,757,538 | 8/56 | Soffel | 73—194 |
| 2,867,119 | 1/59 | Sturgeon et al. | 73—194 |

FOREIGN PATENTS 1,157,500  12/57  France.

RICHARD C. QUEISSER, *Primary Examiner.*
ROBERT L. EVANS, *Examiner.*